United States Patent
Kurani

Patent Number: 5,820,968
Date of Patent: Oct. 13, 1998

[54] SHAPE-RETAINING MOUSE PAD

[75] Inventor: Nadim K. Kurani, Costa Mesa, Calif.

[73] Assignee: Nadim Kurani, Costa Mesa, Calif.

[21] Appl. No.: 740,961

[22] Filed: Nov. 5, 1996

[51] Int. Cl.$^6$ .............. B32B 3/24; B43L 15/00; G09G 1/00

[52] U.S. Cl. .......... 428/137; 428/138; 428/140; 428/304.4; 428/457; 442/9; 345/163; 248/346.01; 248/118.1; 400/715

[58] Field of Search ................ 428/137, 138, 428/140, 304.4, 457; 442/9; 345/163; 248/346.01, 118.1; 400/715

[56] References Cited

U.S. PATENT DOCUMENTS

| 4,077,823 | 3/1978 | Wright | 156/212 |
|---|---|---|---|
| 4,088,805 | 5/1978 | Wiegand | 428/310 |
| 4,799,054 | 1/1989 | House | 340/710 |
| 5,165,630 | 11/1992 | Connor | 248/118.1 |
| 5,208,084 | 5/1993 | Rutz | 428/40 |
| 5,217,781 | 6/1993 | Kuipers | 428/85 |
| 5,335,888 | 8/1994 | Thomsen | 248/118.1 |
| 5,340,067 | 8/1994 | Martin et al. | 248/118.5 |
| 5,340,075 | 8/1994 | Schriner | 248/346 |
| 5,490,647 | 2/1996 | Rice | 248/118.1 |
| 5,492,298 | 2/1996 | Walker | 248/346.01 |
| 5,492,525 | 2/1996 | Gibney | 601/40 |
| 5,508,084 | 4/1996 | Reeves et al. | 428/172 |
| 5,533,697 | 7/1996 | Fletcher et al. | 248/146 |
| 5,556,061 | 9/1996 | Dickie | 248/51 |

Primary Examiner—William P. Watkins, III
Attorney, Agent, or Firm—Price, Gess & Ubell

[57] ABSTRACT

An improved mouse pad of soft and resilient material such as neoprene foam that incorporates a deformable component that allows the pad to retain any shape into which it has been molded. This shape-retaining ability is imparted by constructing the mouse pad as a sandwich in which a layer of shape-retaining material such as open mesh metal screening is laminated between two layers of neoprene foam or similar resilient material. A portion of the mouse pad can readily be molded along the sharp edge of table or formed into a padded ridge to protect the user's wrist. Further, this shape-retaining ability allows the mouse pad orientation to be varied in an ergometrically sound manner to minimize excessive stretching or awkward movements on the part of the user. This invention produces a versatile mouse pad that can be readily altered by the user to solve a wide range of problems.

13 Claims, 2 Drawing Sheets

SHAPE-RETAINING MOUSE PAD

BACKGROUND OF THE INVETION

1. Field of the Invention

The present invention concerns the field of mouse pointing devices and, more particularly, an improved mouse pad with unusually favorable ergonomic properties.

2. Description of Related Art

Today the mouse is an almost universal pointing device for input of positional information into a desktop computer or "PC." Generally the mouse contains a ball that rolls as the mouse is slid over the surface of the desk. Rotation of this ball is used to produce electronic signals which control the x-y (side-to-side, and up-down) position of a cursor or pointer on a computer display screen. The electronics and programming necessary for successful operation of such a device can be quite complex and are beyond the boundaries of the current invention. Surprisingly, the simple mechanics of the rolling ball cause as much or more difficulties than the electronic/computer aspects of the device.

Quite simply, the rolling ball is liable to pick up dust and dirt and to slip unpredictably on most desk surfaces. Therefore, the mouse pad, a special surface for the rolling ball to grip, has been developed. The goal of a mouse pad is to present an upper surface with proper characteristics to promote gripping of the rolling ball. At the same time, the pad presents a lower nonslip surface to the desktop so that the mouse pad will not move about as it is moused upon. Generally, the pads are made of neoprene foam rubber with a fabric coating. They may also be constructed of various rigid plastics such as polycarbonate. While the traditional mouse pad had dealt effectively with the problems of rolling ball slippage, it has not been able to solve the ergometric problems presented by mouse pads.

The public is just becoming aware of the dangers posed by "repetitive stress" injury in many common tasks. Essentially a simple, apparently low stress task such as typing or operating a cash register may actually cause cumulative injury to muscles, nerves, and tendons that result in significant pain, disability, and even paralysis of hands and fingers. The overall solution to these injuries is to improve ergometric design to reduce unnatural, damaging movements and uncomfortable positions or postures. While using a computer mouse does not generally result in the same repetitive impact as keyboard operation, mouse usage often requires exaggerated stretching to reach the mouse and pressure to the wrist or hand caused by less than ideal placement of the mouse. This stretching and pressure can easily result in nerve damage leading to numbness and other disabilities. Also, because the orientation or placement of a mouse pad may be less than ideal, the overall posture of the user may suffer with concomitant problems.

There have been some efforts to ameliorate the situation by providing wrist pads in conjunction with the mouse pad to relieve pressure from table edges, etc.

Also, mouse pads have been produced with a padded bump or ridge at one end to provide cushioning for the underside of a user's wrist. Another possibility is to provide a special adjustable platform so that the orientation and position of the mouse pad can be optimized to reduce stretching, wrist pressure and strained posture. Unfortunately, the wrist pads can deal only with some contact pressure relief and do nothing to optimize mouse pad orientation. The adjustable platforms are effective at adjusting mouse pad orientation but are so expensive and cumbersome that many workers cannot or do not use them. Therefore, there remains a significant need for an inexpensive and effective solution to the problem of mouse pad ergonomics.

OBJECTS AND SUMMARY OF THE INVENTION

It is an object of the present invention to provide an improved mouse pad that permits optimization of mouse pad orientation to reduce stress and strain to the user;

It is another object of the present invention to provide a moldable mouse pad that can readily provide padded "bumps" and other modifications to protect the user from undue pressure;

It is still another object of the present invention to provide a moldable mouse pad that can readily provide a palm rest for the user;

It is yet another object of the present invention to provide a moldable mouse pad that can readily be altered in contour so as to fit in a reduced desk area; and It is a further object of the present invention to provide an improved mouse pad that allows the mouse pad to be molded over a sharp edge to reduce damaging wrist pressure.

These and additional objects are met by a pad constructed of a soft and resilient material such as neoprene foam that incorporates a deformable component that allows the pad to retain any shape into which it has been molded. In this way, a portion of the mouse pad can be molded along the sharp edge of a table to protect the user's wrist or can be formed into a protective ridge or bump. Further, this shape-retaining ability allows the mouse pad orientation to be adjusted to minimize excessive stretching by the user. This shape-retaiing ability is imparted by constructing the mouse pad as a sandwich in which a layer of shape-retaining material such as a metal sheet or mesh is laminated between two layers of neoprene foam or similar resilient material.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a moldable shape-retaining mouse pad.

Mouse pads made of traditional neoprene foam or similar materials are completely flexible, molding themselves to the surface contours of a desktop or other surface upon which they are placed. For this reason they must be used on a reasonably flat surface. This flexibility makes them ideal for protecting a user's wrist from a sharp surface such as the edge of a table or desk. However, once placed to provide such protection, the mouse pad, being elastic, merely flops about and doesn't stay in position. The current invention adds a shape-retaining property to the elastic foam so that the pad can be shaped over an edge or into a padded ridge and retain that configuration.

Figure 1:
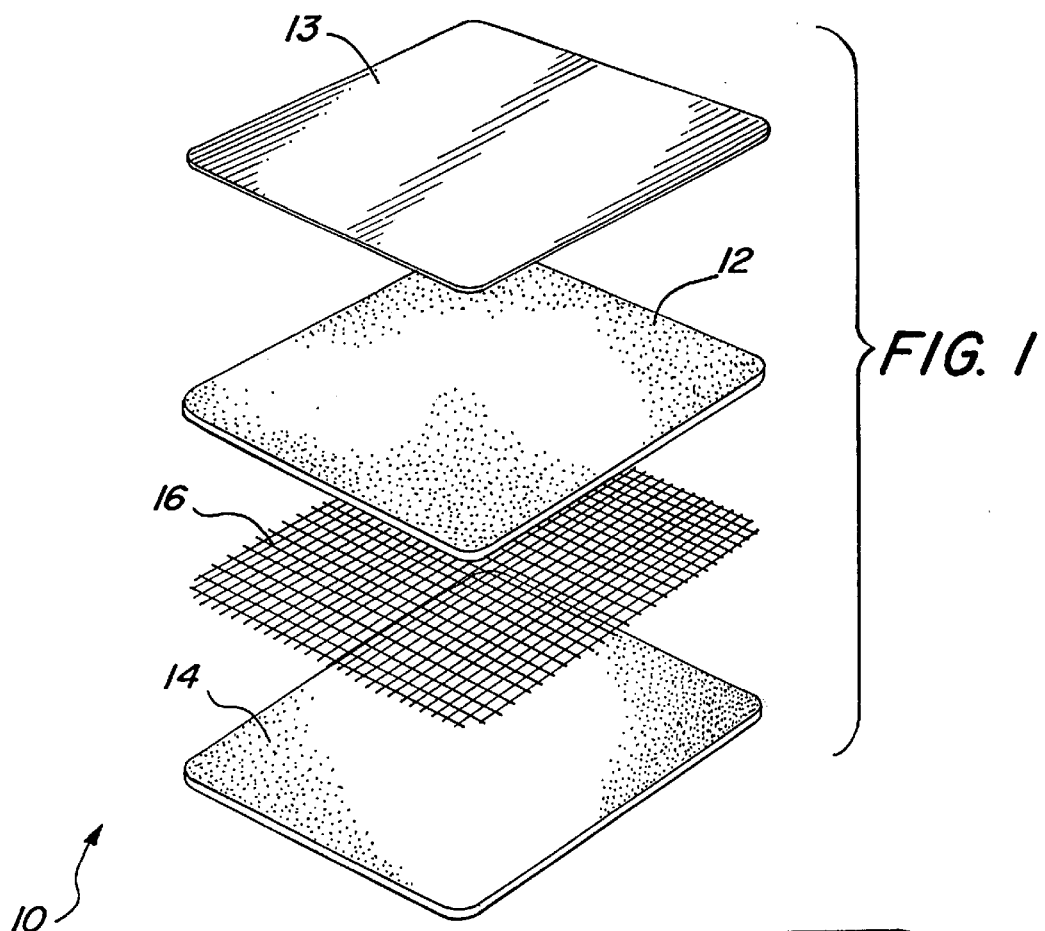
FIG. 1 shows an exploded view of one embodiment of the present invention.

FIG. 1 shows an exploded view of one embodiment of a mouse pad 10 of the present invention. A typical mouse pad of the prior art is about 9 inches by 7.5 inches, although a wide variety of dimensions can be and are used. The mouse pad 10 of the present invention is advantageously somewhat larger than usual, say 11 inches by 8½ inches, to allow extra material for molding over edges, forming into ridges, etc. The mouse pad 10 consists of an upper layer 12 and a lower layer 14 of elastic, resilient material. These layers 12, 14 can advantageously be formed of neoprene, or other rubber or plastic (i.e., polyurethane) foam, although other elastic-plastic materials (i.e., solid polyurethane or polyvinyl chloride) can also be employed. Generally the upper layer 12 will have a fabric layer 13 laminated to it. In essence, the upper layer 12 with fabric layer 13 are equivalent to a prior art mouse pad. In most cases the upper layer 12 and the lower layer 14 will be of identical composition. However, there may be some advantage to varying the density, composition, or color of the two layers. This may be done for purely aesthetic reasons or to provide a physical difference, i.e., making the lower layer out of solid polyurethane so that it will more tightly grip the surface of a desk.

A shape-retaining layer 16 is laminated between the upper layer 12 and the lower layer 15. The shape-retaining layer 16 can be composed of any malleable material that can be readily deformed and will then maintain its new configuration. The present inventor has found that this property of malleability and shape-retention is most commonly found in thin sheets of various metals, although other more exotic materials such as various composites may also be useable in the present invention. The range of malleable metals is quite large including, copper, aluminum, lead, tin, and soft iron, to name a few of the most obvious choices. To a large extent, the thickness of the layer 16 must be matched to the properties of an individual metal or alloy. For instance, thin copper foil (say $^{10-20}/_{1000}$-inch) shows ideal properties of malleability and shape-retention. However, aluminum at the same thickness, while readily malleable, does not adequately retain its shape against the elastic pull of the resilient layers 12, 14. For aluminum to operate effectively a greater thickness must be employed—copper, however, of that thickness is generally too rigid. Soft metals such as lead allow the shape-retaining layer 16 to be considerably thicker, about $^{1}/_{16}$-inch or so. The selection of the ideal metal is a matter of balancing metal properties against price. An advantage to relatively "soft" metals such as lead or soft iron is that they permit repeated flexing without metal fatigue and failure.

It must not be assumed that the ideal configuration of the shape-retaining layer 16 is necessarily a simple sheet of metal or other deformable material. The present inventor has found that open mesh metal screening ("hardware" cloth) or metal sheeting with a plurality of perforations provides a number of advantages often combining improved malleability and shape retention as compared to simple metal sheets. Perhaps more important is the ease of lamination when the upper layer 12 and the lower layer 14 are separated by a screen or perforated sheet as the shape-retaining layer 16. In such a configuration the upper layer 12 contacts the lower layer 14 through the mesh opening or through the perforation, forming a much stronger bond than is generally possible in gluing these layers to a simple metal sheet. In fact, it is possible to incorporate the shape-retaining layer 16 during manufacture of the resilient layer so that the upper layer 12 and lower layer 14 are actually continuous through the shape-retaining layer 16, completely obviating the need for a lamination step (and thus permanently trapping the shape-retaining layer 16 within the mouse pad 10).

Figure 2:
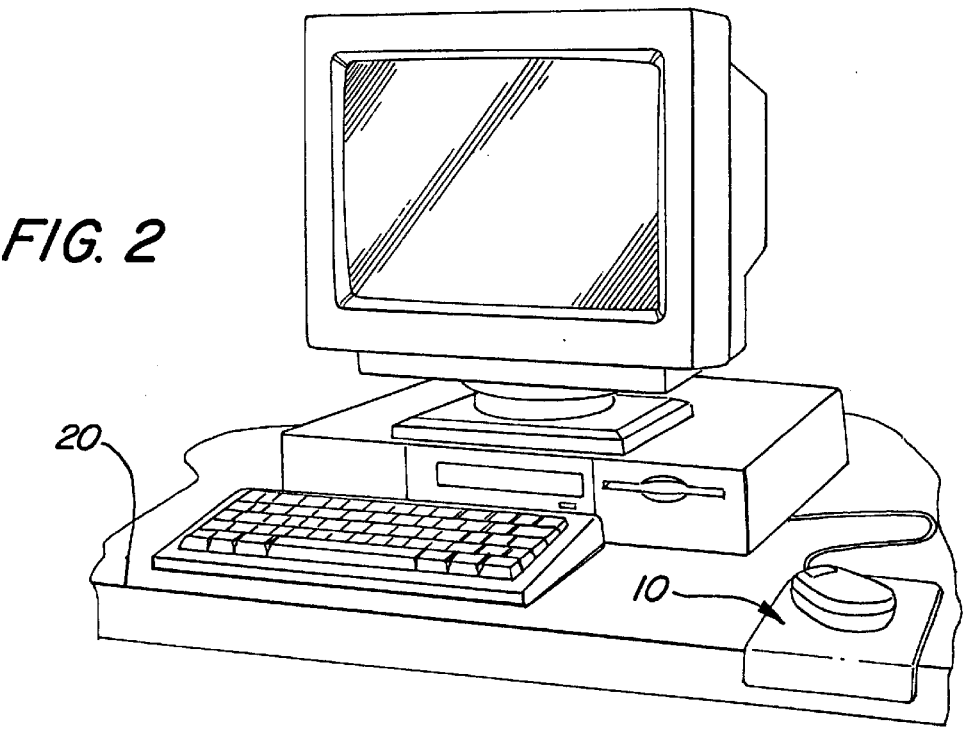
FIG. 2 shows the present invention molded over the edge of a table.
Figure 3:
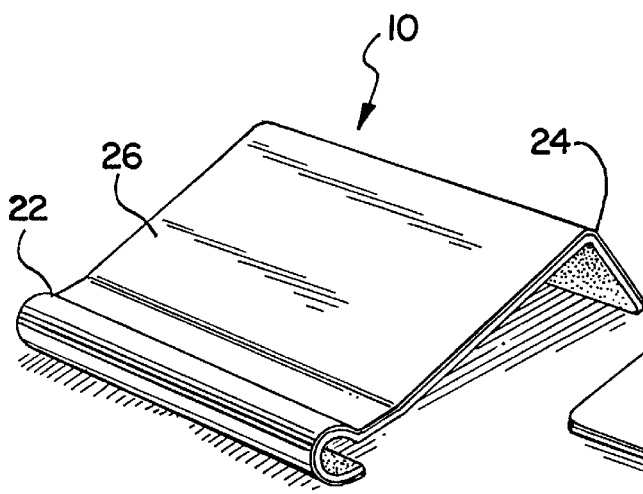
FIG. 3 shows the present invention where one edge has been formed into a protective ridge while another edge has been turned under to cant the entire device.
Figure 4:
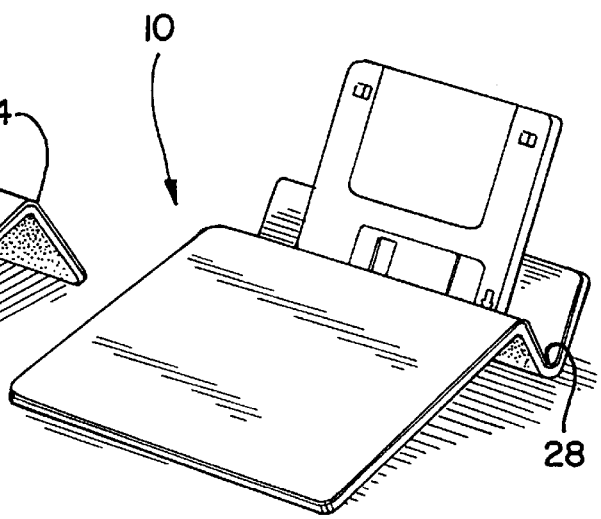
FIG. 4 shows a further modification of the mouse pad to allow it to conveniently hold computer discs.

FIG. 2 shows a mouse pad 10 of the present invention molded over the edge of a table 20 so that the pad cushions between the edge and a user's wrist. FIG. 3 shows a mouse pad 10 of the present invention where one edge of the mouse pad 10 have been turned under to provide a peripheral ridge 22 to cushion the users wrist. At the same time another edge 24 of the mouse pad 10 has been deformed to cant the entire surface 26 of the mouse pad 10 so as to present a more comfortable working angle. Since the shape-retaining layer 16 allows the mouse pad 10 to be molded into almost any conceivable shape, there are numerous other ways of orienting the mouse pad 10 to generally relieve stress to the user or provide novel modifications. FIG. 4 shows yet another modification made possible by the present invention. Here an edge of the mouse pad 10 has been deformed into a trough 28 shaped to hold a computer disk 29 in a convenient position. In addition, the deformable mouse pad 10 of the present invention allows the edges of the mouse pad 10 to be folded under to adapt the mouse pad 10 to a cramped desk area (not shown). The possible modifications of the deformable mouse pad 10 of the present invention are virtually endless and no limit should be placed on the invention as a result of the relatively small number of modifications illustrated herein. It is the intention of the present invention to provide an extremely versatile mouse p that can readily be adapted to needs of the user.

Figure 5:
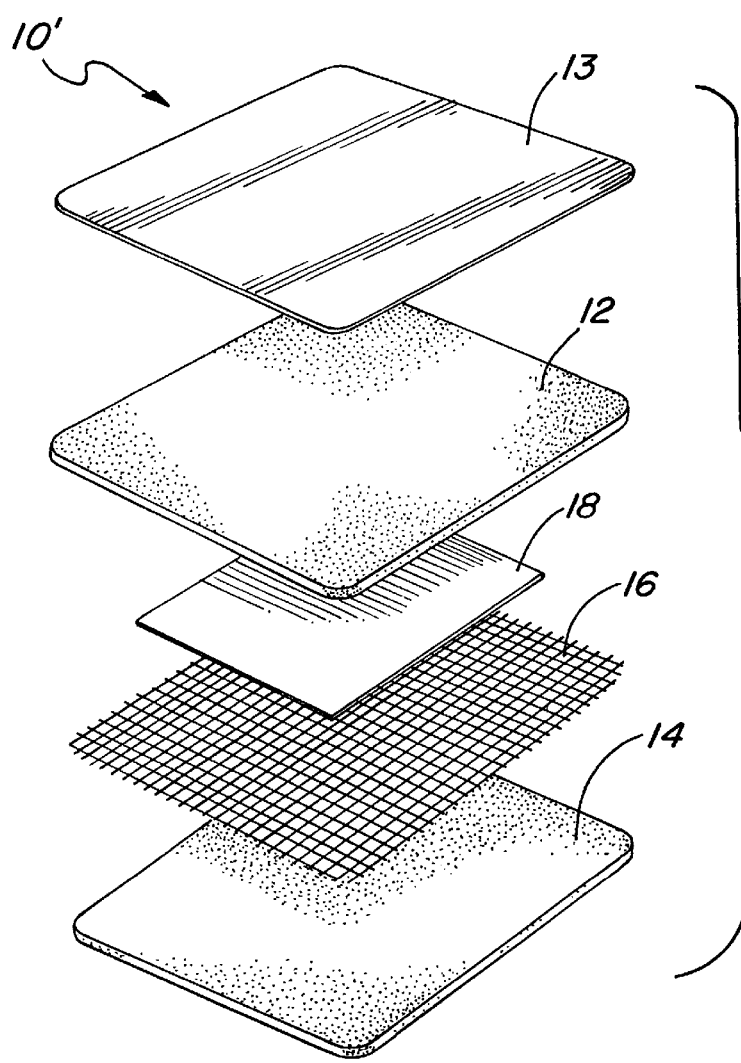
FIG. 5 shows an alternate embodiment in which a stiffening material is introduced to ensure flatness of a central portion of the mouse pad.

Of course, during the various modifications it is important to keep the central areas of the pad relatively flat, as the mouse does not readily tolerate a bumpy surface. Also, the surface should be kept relatively level to avoid spontaneous rolling of the mouse. An alternate embodiment, shown in exploded view in FIG. 5, deals with problems of maintaining flatness in the central area of the pad. In addition to the shape-retaining layer 16, a central region of the pad also receives a stiffening layer 18. This layer is advantageously composed of rigid plastic or metal which may advantageously be perforated or of mesh to enhance the binding of the upper and lower layers 12, 14. The purpose of the stiffening layer 18 is to keep the central "mousing" part of the pad flat despite various bending or molding of the edge areas of the mouse pad 10. This allows a flat central working area (probably about 9 inches by 7 inches) surrounded by a peripheral region ( for example, 2–3 inches wide) of malleable, adjustable mouse pad. It is even possible to construct a mouse pad where the stiffening layer 18 is actually bendable but requires much more effort to bend than the peripheral region. For example, the stiffening layer 18 might represent a double layer of the same hardware cloth that forms the shape-retaining layer 16. Or the stiffening layer 18 might represent a layer of hardware cloth made out of larger gauge of wire than the shape-retaining layer 16. Although it is possible to have only the stiffening layer 18 in the center of the pad with the shape-retaining layer 16 restricted to the periphery, it is generally simple to overlap the stiffening layer 18 and the shape-retaining layer 16. That is, the shape-retaining layer 16 has dimensions roughly equivalent to those of the whole mouse pad 10, while the stiffening layer 18 has smaller dimensions. Generally, the stiffening layer 18 will be centralized, but there is no reason that the stiffening layer 18 cannot be asymmetrically placed, yielding a mouse pad 10 with a larger malleable region along one edge of the mouse pad 10.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A moldable, shape-retaining mouse pad comprising:
    an upper layer of a first resilient material;
    a lower layer of a second resilient material; and
    an intermediate layer of a malleable, shape-retaining material, the intermediate layer trapped between the upper and the lower layer to form the mouse pad, wherein the shape of the mouse pad is adaptable to the changing needs of a user.

2. The mouse pad of claim 1, wherein the first resilient material is the same as the second resilient material.

3. The mouse pad of claim 1, wherein the resilient materials are selected from the group consisting of neoprene foam, natural rubber foam, polyurethane foam, solid polyurethane, and solid polyvinyl chloride.

4. The mouse pad of claim 1, wherein the resilient layer comprises a piece of open mesh metal screening.

5. The mouse pad of claim 4, wherein the metal composing the open mesh screening is selected from the group consisting of copper, aluminum, soft iron, and steel.

6. The mouse pad of claim 1, wherein the resilient layer comprises a sheet of perforated metal.

7. A moldable, shape-retaining mouse pad comprising:
    an upper layer of a first resilient material;
    a lower layer of a second resilient material;
    an intermediate layer of a malleable, shape-retaining material, the intermediate layer trapped between the upper and the lower layers; and
    an additional layer also disposed between the upper and lower layers, having a smaller surface area than the layer of shape-retaining material, the additional layer for stiffening a region of the mouse pad so that region remains substantially flat, wherein the shape of the mouse pad is adaptable to a need of the user.

8. The mouse pad of claim 7, wherein the first resilient material is the same as the second resilient material.

9. The mouse pad of claim 7, wherein the resilient materials are selected from the group consisting of neoprene foam, natural rubber foam, polyurethane foam, solid polyurethane, and solid polyvinyl chloride.

10. The mouse pad of claim 7, wherein the resilient layer comprises a piece of open mesh metal screening.

11. The mouse pad of claim 10, wherein the metal composing the open mesh screening is selected from the group consisting of copper, aluminum, soft iron, and steel.

12. The mouse pad of claim 7, wherein the resilient layer comprises a sheet of perforated metal.

13. The mouse pad of claim 7, wherein the additional stiffening layer is disposed centrally in relation to the intermediate layer so that the finished mouse pad has a stiff, flat central area surrounded by malleable, shape-retaining peripheries.

* * * * *